(12) United States Patent
Yoneda et al.

(10) Patent No.: US 10,924,406 B2
(45) Date of Patent: Feb. 16, 2021

(54) CONTROL DEVICE, CONTROL SYSTEM, CONTROL METHOD, AND NON-TRANSITORY COMPUTER-READABLE STORAGE MEDIUM

(71) Applicant: OMRON Corporation, Kyoto (JP)

(72) Inventors: Mitsuhiro Yoneda, Tenri (JP); Shigenori Sawada, Takatsuki (JP); Hirohito Mizumoto, Otsu (JP); Ziqiang Xu, Kusatsu (JP)

(73) Assignee: OMRON Corporation, Kyoto (JP)

( * ) Notice: Subject to any disclaimer, the term of this patent is extended or adjusted under 35 U.S.C. 154(b) by 26 days.

(21) Appl. No.: 16/188,206

(22) Filed: Nov. 12, 2018

(65) Prior Publication Data

US 2019/0253356 A1 Aug. 15, 2019

(30) Foreign Application Priority Data

Feb. 14, 2018 (JP) .............................. JP2018-024088

(51) Int. Cl.
*H04L 12/801* (2013.01)
*H04L 12/851* (2013.01)
(Continued)

(52) U.S. Cl.
CPC .............. *H04L 47/12* (2013.01); *H04L 29/08* (2013.01); *H04L 47/2425* (2013.01);
(Continued)

(58) Field of Classification Search
CPC ..... H04L 47/10; H04L 47/2441; H04L 47/30; H04L 47/32; H04L 12/5693
(Continued)

(56) References Cited

U.S. PATENT DOCUMENTS 3,530,438 A * 9/1970 Nelson .............. G06F 15/17375
718/100
4,280,285 A * 7/1981 Haas .................... G06F 11/277
434/30
(Continued)

FOREIGN PATENT DOCUMENTS

DE 112015006192 11/2017
DE 112015006192 T5 * 11/2017 ....... H04L 29/08954
(Continued)

OTHER PUBLICATIONS

"Search Report of Europe Counterpart Application", dated Feb. 15, 2019, p. 1-p. 7.

*Primary Examiner* — Peter G Solinsky
*Assistant Examiner* — Sanjay K Dewan
(74) *Attorney, Agent, or Firm* — JCIPRNET

(57) ABSTRACT

A control device includes a cyclic communication part and a communication management part. A cyclic communication part controls communication of first control data of which arrival in a first guarantee time is guaranteed according to a preset cyclic period and second control data of which arrival in a second guarantee time longer than the cyclic period is guaranteed and of which a sequence of information included is determined. The communication management part manages a communication schedule of first control data and second control data. When new second control data is acquired while the second control data is divided into a plurality of communication data and communicated according to the cyclic period, the communication management part determines a communication sequence of the plurality of second control data according to priorities of the plurality of second control data.

10 Claims, 9 Drawing Sheets

(51) Int. Cl.
*H04L 29/06* (2006.01)
*H04L 29/08* (2006.01)

(52) U.S. Cl.
CPC .............. *H04L 47/34* (2013.01); *H04L 67/12* (2013.01); *H04L 69/00* (2013.01)

(58) Field of Classification Search
USPC ........................................................ 370/235
See application file for complete search history.

(56) References Cited

U.S. PATENT DOCUMENTS

| | | | | |
|---|---|---|---|---|
| 4,484,120 A * | 11/1984 | Olex | ................ | B25J 9/1671 318/568.14 |
| 4,772,831 A * | 9/1988 | Casler, Jr. | ............ | G05B 19/416 318/567 |
| 4,799,052 A * | 1/1989 | Near | ................ | H04L 12/417 370/451 |
| 4,803,613 A * | 2/1989 | Kametani | .......... | G05B 19/4141 700/3 |
| 6,167,328 A * | 12/2000 | Takaoka | ................ | B25J 9/1671 318/568.1 |
| 6,259,705 B1 * | 7/2001 | Takahashi | ............... | H04L 47/10 370/230 |
| 6,496,878 B1 * | 12/2002 | Azevedo | ................ | G06F 13/32 710/15 |
| 2002/0165643 A1 * | 11/2002 | Bancroft | .............. | G06Q 10/087 700/245 |
| 2004/0024490 A1 * | 2/2004 | McLurkin | ............ | G05D 1/0297 700/245 |
| 2004/0030453 A1 * | 2/2004 | Graf | ....................... | B25J 9/1669 700/245 |
| 2017/0034033 A1 * | 2/2017 | Mizoguchi | ........... | G05B 19/048 |
| 2017/0259433 A1 * | 9/2017 | Takeuchi | ............... | B25J 9/0081 |
| 2017/0373821 A1 * | 12/2017 | Arakawa | ................ | G06F 13/42 |
| 2018/0203818 A1 * | 7/2018 | Fukuda | ................ | G06F 13/4022 |
| 2018/0249324 A1 * | 8/2018 | Parviainen | ............. | H04W 8/24 |
| 2018/0331791 A1 * | 11/2018 | Li | ..................... | H04W 56/0015 |
| 2019/0126475 A1 * | 5/2019 | Kawanishi | ............. | B25J 9/1623 |
| 2019/0253355 A1 * | 8/2019 | Sawada | ................... | H04L 47/12 |

FOREIGN PATENT DOCUMENTS

| | | | | |
|---|---|---|---|---|
| JP | 2004363782 | | 12/2004 | |
| JP | WO2018003117 A1 * | | 1/2018 | ............ H04L 12/28 |
| WO | 2018003117 | | 1/2018 | |

* cited by examiner

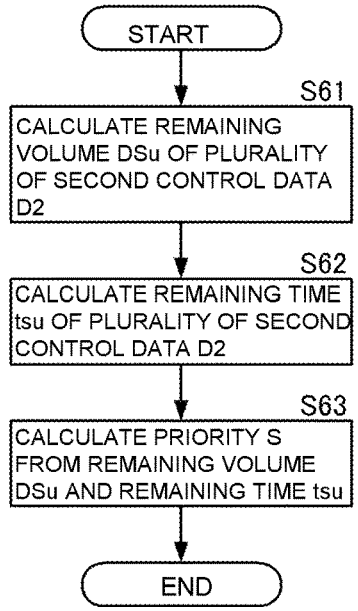

FIG.11

TIME Tc(n)

| SECOND CONTROL DATA | REMAINING TIME tsu [msec.] | REMAINING VOLUME DSu [byte] | PRIORITY S | TRANSMISSION VOLUME [byte] |
|---|---|---|---|---|
| D21 | 4 | 800 | 341.3 | 256 |
| D22 | 100 | 1000 | 10.1 | |

TIME Tc(n+1)

| SECOND CONTROL DATA | REMAINING TIME tsu [msec.] | REMAINING VOLUME DSu [byte] | PRIORITY S | TRANSMISSION VOLUME [byte] |
|---|---|---|---|---|
| D21 | 3 | 544 | 272 | 206 |
| D22 | 99 | 1000 | 10.2 | |
| D23 | 1 | 50 | ∞ | 50 |

TIME Tc(n+2)

| SECOND CONTROL DATA | REMAINING TIME tsu [msec.] | REMAINING VOLUME DSu [byte] | PRIORITY S | TRANSMISSION VOLUME [byte] |
|---|---|---|---|---|
| D21 | 2 | 338 | 338 | 256 |
| D22 | 98 | 1000 | 10.3 | |

TIME Tc(n+3)

| SECOND CONTROL DATA | REMAINING TIME tsu [msec.] | REMAINING VOLUME DSu [byte] | PRIORITY S | TRANSMISSION VOLUME [byte] |
|---|---|---|---|---|
| D21 | 1 | 82 | ∞ | 82 |
| D22 | 97 | 1000 | 10.3 | 174 |

FIG.12

CONTROL DEVICE, CONTROL SYSTEM, CONTROL METHOD, AND NON-TRANSITORY COMPUTER-READABLE STORAGE MEDIUM

CROSS-REFERENCE TO RELATED APPLICATION

This application claims the priority of Japan patent application serial no. 2018-024088, filed on Feb. 14, 2018. The entirety of the above-mentioned patent application is hereby incorporated by reference herein and made a part of this specification.

BACKGROUND

Technical Field

The disclosure relates to a control system including a control device that performs communication of a plurality of types of control data having different performance requirements and various slave devices.

Description of Related Art

Currently, many factory automation (FA) systems are in practical use. An FA system includes a control device and a plurality of slave devices. The plurality of slave devices include a measurement instrument, a switch, a control driver, and the like, and a control target device is connected to the control driver.

The control device performs communication of control data with a plurality of slave devices. In this case, the control device performs sequential communication of control data with a plurality of slave devices using a preset control period (cyclic period). Therefore, a real time property of transmission of control data is guaranteed. Hereinafter, the control data will be referred to as cyclic control data.

On the other hand, information system data different from cyclic control data is communicated between a control device and a plurality of slave devices. Information system data is data that need not necessarily be communicated using a cyclic period and has a relatively large volume like control data. In the system shown in Patent Document 1, the information system data is divided and communicated in a plurality of cyclic periods in a divided manner.

PATENT DOCUMENTS

[Patent Document 1] Japanese Unexamined Patent Application Publication No. 2004-363782

Currently, as a slave device, a robot device or a robot control device configured to control a robot device is often used.

Control data communicated to a robot device, a robot control device, or the like includes a plurality of commands and the like, and may have a larger volume than cyclic control data of the related art. Hereinafter, control data that is communicated to a robot device, a robot control device, or the like and has a larger volume than cyclic control data of the related art will be referred to as quasi-control data.

In this case, for example, it is conceivable that the control device divides quasi-control data into a plurality of cyclic periods and performs communication.

However, when such quasi-control data having a large volume occupies a communication band for a plurality of cyclic periods, even if control data having a high urgency is acquired while the quasi-control data is communicated, communication is only possible after communication of the quasi-control data is completed. Therefore, there is a possibility of newly acquired control data not being communicated within an arrival guarantee time.

The disclosure provides a communication technology through which, even if control data having high urgency is acquired while control data having a large volume for which a plurality of cyclic periods are necessary is communicated, it is possible to reliably communicate the control data having a high urgency.

SUMMARY

According to an example of the disclosure, a control device includes a cyclic communication part and a communication management part. A cyclic communication part controls communication of first control data of which arrival in a first guarantee time is guaranteed according to a preset cyclic period and second control data of which arrival in a second guarantee time longer than the cyclic period is guaranteed and of which a sequence of information included is determined. The communication management part manages a communication schedule of first control data and second control data. When new second control data is acquired while the second control data is divided into a plurality of communication data and communicated according to the cyclic period, the communication management part determines a communication sequence of the plurality of second control data according to priorities of the plurality of second control data.

In addition, according to an example of the disclosure, a control system includes one of the above control devices and a robot device or a robot control device that is communicably connected to the control device. The second control data includes a command group for robot control.

BRIEF DESCRIPTION OF THE DRAWINGS

FIG. 11 is a flowchart showing a priority calculation method.

FIG. 12 is a diagram for explaining a priority calculation concept and a data transmission concept according to a priority.

DESCRIPTION OF THE EMBODIMENTS

Embodiments of the disclosure will be described below with reference to the drawings.

Application Example

Figure 4:
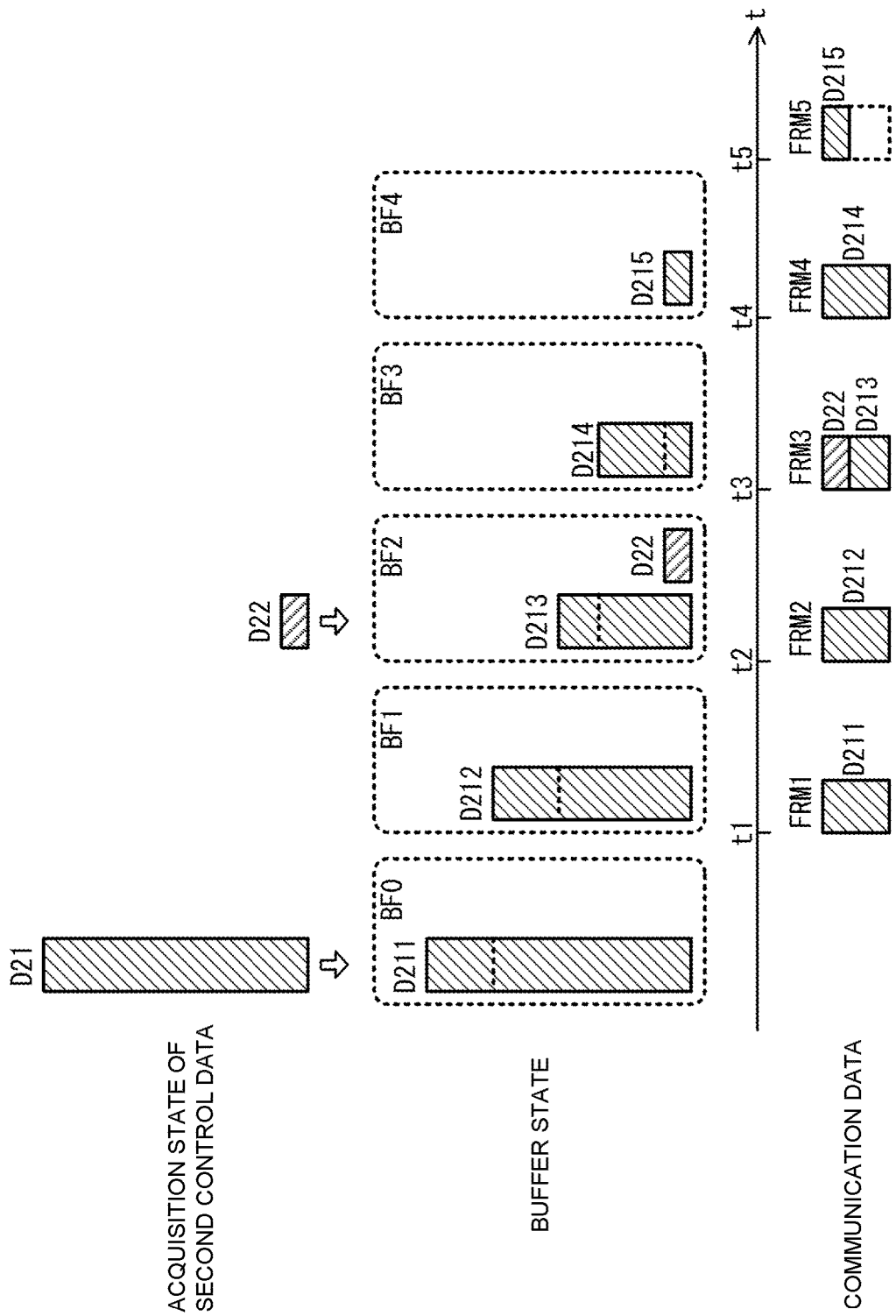
FIG. 4 is a diagram showing a communication concept of the disclosure.

First, an application example of a control device according to an embodiment of the disclosure will be described with reference to the drawings. FIG. 4 is a diagram showing a communication concept of the disclosure.

The control device performs communication of first control data and second control data according to a cyclic period.

The first control data is control data having a small data volume. Specifically, the first control data includes, for example, a servo command value, an encoder value, and an on and off control value of a sensor, and the like. The first control data is control data that is defined so that communication is completed in an arrival guarantee time defined by a cyclic period.

The second control data is control data that is defined so that communication is completed in an arrival guarantee time longer than one cycle of a cyclic period. As the second control data, there is data having a larger data volume than first control data. For example, there is data having a larger volume than a data volume that can be communicated in one cycle of a cyclic period.

When a data volume of second control data exceeds a communication upper limit volume for second control data allocated in one cycle of a cyclic period, the control device divides the second control data into a plurality of communication data and performs communication.

Here, the control device performs the following control when a plurality of second control data having different priorities are communicated for one slave device.

As shown in FIG. 4, the control device divides second control data D21 and performs communication of the divided data. During communication in a divided manner, when new second control data D22 is acquired for the same slave device as the communication target of the second control data D21, the control device compares priorities of the second control data D21 and the second control data D22. When a priority of the second control data D22 is higher than a priority of the second control data D21, the control device temporarily stops communication of the second control data D21 and interrupts communication of the second control data D22. Here, temporarily stop of communication of the second control data D21 does not mean strictly terminating communication, but means that, in original scheduling, a packet allocated to the second control data D21 is allocated to the second control data D22, and allocation of the second control data D21 is performed later.

Therefore, during communication of the second control data D21 having a low priority, communication of the second control data D22 having a high priority is completed first. Therefore, performance requirements of the second control data D22 having a high priority can be satisfied.

In this case, when a data volume of the second control data D22 does not reach a communication upper limit volume for second control data allocated in one cycle of a cyclic period, as shown in FIG. 4, the control device allocates the remaining volume in the cyclic period during which the second control data D22 is communicated to the second control data D21 that is temporarily stopped. Therefore, communication of the second control data D21 can be resumed quickly.

Configuration Examples

A control device, a control system, a control method, and a control program according to embodiments of the disclosure will be described with reference to the drawings. In the present embodiment, a factory automation (FA) system will be exemplified as a control system.

Figure 1:
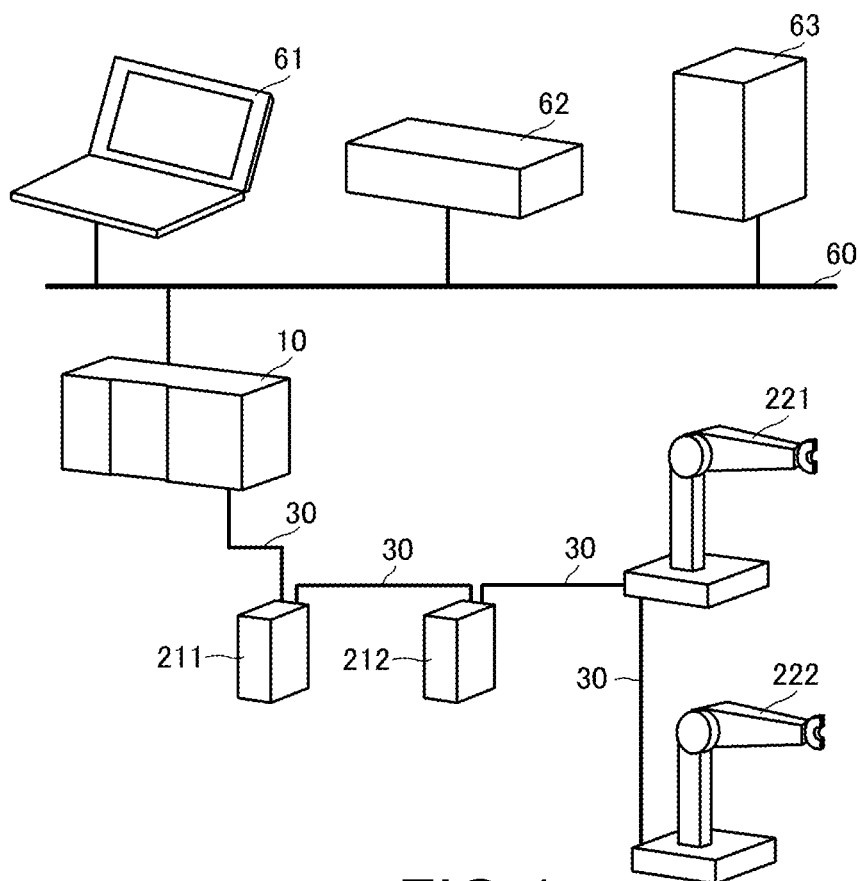
FIG. 1 is a diagram showing a schematic configuration of a device in a control system.

FIG. 1 is a diagram showing a schematic configuration of a device in a control system. As shown in FIG. 1, a control system 1 includes a control device 10, a slave device 211, a slave device 212, a slave device 221, a control network 30, an information communication network 60, a personal computer 61, an industrial personal computer 62, and a database device 63.

(Data Definition)

First, a definition of data will be described.

In first control data, an arrival guarantee time (first guarantee time) is determined according to one cycle of a cyclic period (for example, 10 msec or shorter) used in the control network 30. The first control data is composed of a control data group of 1 bit to several tens of bytes. The arrival guarantee time is, for example, the longest (latest) time within which control data should arrive in order for a target slave device to operate normally.

The second control data is data in which an arrival guarantee time (second guarantee time) is set longer than one cycle of a cyclic period. As the second control data, there is data having a larger data volume than first control data. For example, there is data having a larger volume than a data volume that can be communicated in one cycle of a cyclic period. The second control data is control data in which a sequence of a plurality of pieces of information to be included is determined. The second control data includes, for example, a plurality of command groups that implement a sequence operation of a robot device.

The information system data is data which is different from the first control data and the second control data and in which an arrival guarantee time is not set. For example, the information system data may include various types of data such as acquisition request data of a log of each device connected to the control network 30, a log, and a monitoring image.

The first control data and the second control data are data that is communicated according to a cyclic period, and the information system data is data that is communicated according to a specification that need not conform to a cyclic period.

(Control System)

The control network 30 is, for example, a network according to EtherCAT (registered trademark) or PROFINET as a network standard. Here, the control network 30 is not limited thereto, and may be a network through which data is transmitted and received in synchronization with a cyclic period. The control device 10, the slave device 211, the slave device 212, and the slave device 221 are connected via the control network 30.

The information communication network 60 is, for example, a network according to Ethernet (registered trademark) as a network standard. The control device 10, the personal computer 61, the industrial personal computer 62, and the database device 63 are connected via the information communication network 60.

In the personal computer 61, an editing tool of a control program and the like are installed. The personal computer 61 creates, edits, and outputs a control program of the control device 10, the slave device 211, and the slave device 212. The personal computer 61 outputs the control program to the control device 10.

In the industrial personal computer 62, for example, an editing tool of a robot control program and the like are installed. The industrial personal computer 62 creates, edits, and outputs a control program of the slave device 221. The industrial personal computer 62 outputs, for example, the robot control program to the control device 10.

The database device 63 stores a log of each device from the control device 10 and the like. Here, a device that generates and acquires original data of information system data is not limited to the database device 63, and may be another device. In addition, the personal computer 61, the industrial personal computer 62, and the database device 63 are devices constituting a host system, and the devices constituting the host system are not limited thereto.

Specifically, the control device 10 is realized by, for example, a programmable logic controller (PLC). The control device 10 may be another device as long as it performs communication of control data via the control network 30 and performs communication of various types of data via the information communication network 60.

For example, the control device 10 may generate first control data using the control program from the personal computer 61. For example, the control device 10 may generate second control data using the robot control program from the industrial personal computer 62. Here, the control device 10 can generate second control data using the control program from the personal computer 61.

In addition, the control device 10 generates information system data. The information system data includes information that the personal computer 61 wishes to acquire from the slave device 211, the slave device 212, and the slave device 221 connected to the control network 30, an acquisition request of the information, and the like. Therefore, for example, information system data is generated by the control device 10 according to an instruction from the personal computer 61.

Specifically, the slave device 211 and the slave device 212 are realized by a measurement instrument, for example, a servo driver, or a sensor. Here, the slave device 211 and the slave device 212 may be other devices as long as they are devices that operate with first control data.

Specifically, the slave device 221 and a slave device 222 are realized by, for example, a robot device or a robot control device connected to a robot device. Here, the slave device 221 and the slave device 222 may be other devices as long as they are devices that operate with second control data.

The control device 10, the slave device 211, the slave device 212, the slave device 221, and the slave device 222 perform scheduling of transmission and reception of first control data, second control data, and information system data. The control device 10, the slave device 211, the slave device 212, the slave device 221, and the slave device 222 perform communication of first control data and second control data according to the schedule and according to a cyclic period. In addition, as necessary, the control device 10, the slave device 211, the slave device 212, the slave device 221, and the slave device 222 perform communication of information system data according to the schedule using a band different from a band of first control data and second control data.

In this case, the control device 10 divides second control data into a plurality of communication data when a data volume of second control data is larger than an upper limit volume for second control data secured in one cycle of a cyclic period. Then, the control device 10 allocates the plurality of communication data in a plurality of cyclic periods and performs communication.

In addition, when another new second control data is acquired in a period during which second control data is communicated in a plurality of divided cyclic periods, the control device 10 performs communication control according to a priority of respective second control data. In this case, the control device 10 performs communication control according to a priority for each slave device. Specific communication control thereof will be described below.

(Hardware Configuration of Control Device)

Figure 2:
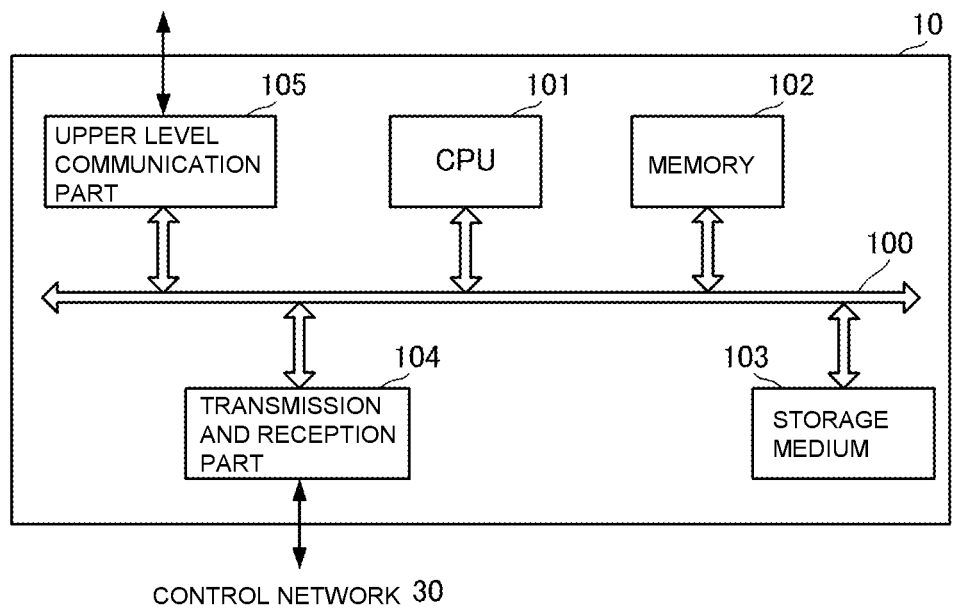
FIG. 2 is a block diagram showing a hardware configuration of a control device.

FIG. 2 is a block diagram showing a hardware configuration of the control device.

As shown in FIG. 2, as a hardware configuration, the control device 10 includes a CPU 101, a memory 102, a storage medium 103, a transmission and reception part 104, and an upper level communication part 105. In the control device 10, the CPU 101, the memory 102, the storage medium 103, the transmission and reception part 104, and the upper level communication part 105 are connected through a data bus 100.

The CPU 101 reads a system program stored in the storage medium 103 and a user application program to the memory 102 and executes them, and thus implements processes of functional blocks to be described below. The memory 102 is realized by a volatile memory element, for example, a DRAM and an SRAM. In addition, the storage medium 103 is realized by a nonvolatile storage medium, for example, a magnetic storage medium and a flash memory.

The transmission and reception part 104 is an interface of the control network 30 in the control device 10 and transmits and receives (communicates) first control data and second control data according to a cyclic period. In addition, for example, the transmission and reception part 104 transmits and receives (communicates) information system data using a communication band different from a communication band of first control data and second control data in a cyclic period.

The upper level communication part 105 is an interface of the information communication network 60 in the control device 10 and performs communication with each device of the above host system.

(Functional Block of Control Device)

Figure 3:
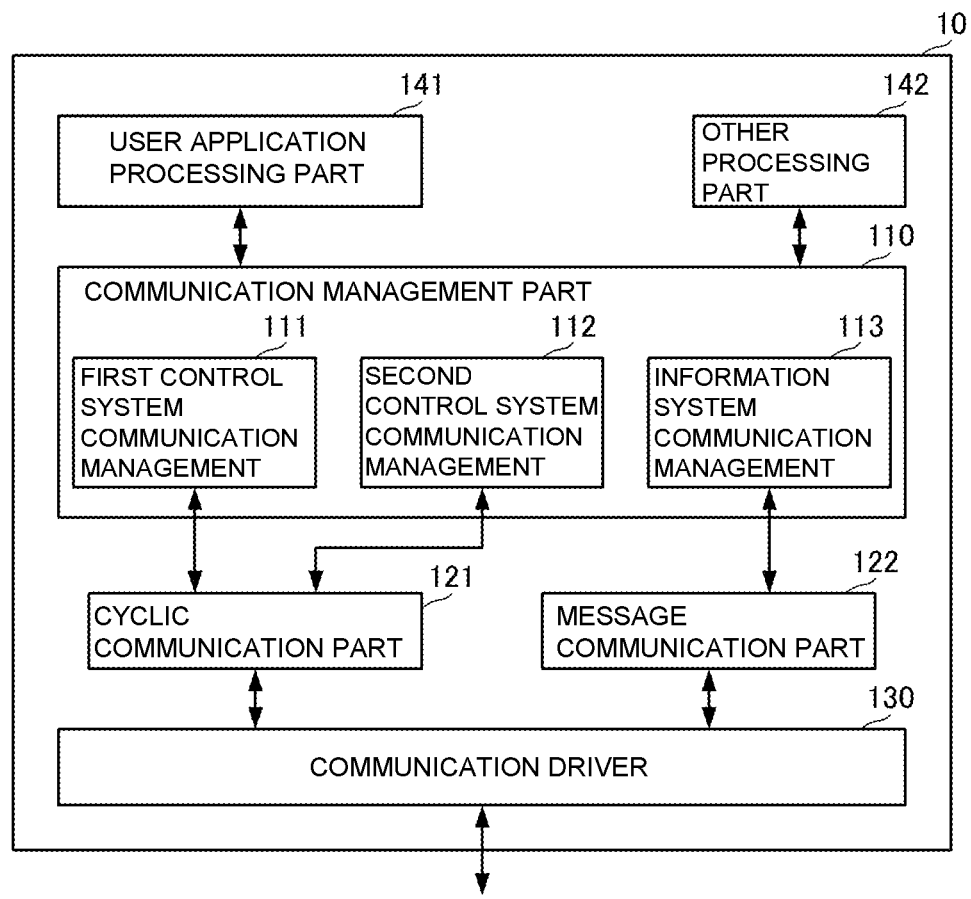
FIG. 3 is a functional block diagram of the control device.

FIG. 3 is a functional block diagram of the control device.

As shown in FIG. 3, the control device 10 includes a communication management part 110, a cyclic communication part 121, a message communication part 122, a communication driver 130, a user application processing part 141, and another processing part 142.

The communication management part 110 performs first control system communication management 111, second control system communication management 112, and information system communication management 113. In addition, the communication management part 110 performs scheduling of the first control system communication management 111, the second control system communication management 112, and the information system communication management 113, that is, scheduling of communication of various types of data to be described below. In this case, the communication management part 110 allocates a communication band of each slave device in one cycle of a cyclic period based on the number and the type of communication target slave devices (refer to FIG. 5).

As described above, in the first control system communication management 111, communication management of first control data communicated for each cyclic period according to a preset cyclic period is performed.

In the second control system communication management 112, communication management of second control data is performed. In this case, when a data volume of second control data is larger than a maximum volume (communication volume) of second control data that can be communicated in one cycle of a cyclic period, the second control system communication management 112 divides second control data into a plurality of communication data. In this case, in the second control system communication management 112, it is determined whether division is performed for each slave device. In the second control system communication management 112, communication management in units of a plurality of communication data is performed.

In the information system communication management 113, communication management of information system data is performed. In this case, information system data is also divided into a plurality of data when a data volume of information system data is larger than a maximum volume (transmission volume) of information system data that can be communicated in one cycle of a cyclic period. Then, in the information system communication management 113, communication management is performed in units of a plurality of divided data.

The communication management part 110 provides first control data and second control data to the cyclic communication part 121 according to a transmission and reception (communication) schedule. In this case, when second control data is divided into a plurality of communication data, the communication management part 110 provides each of the plurality of communication data to the cyclic communication part 121.

In addition, when the communication management part 110 divides second control data into a plurality of communication data and acquires another new second control data within a period of communication in units of cyclic periods, it performs communication control according to a priority of respective second control data. Specific communication control thereof will be described below.

The communication management part 110 provides information system data to the message communication part 122 according to a transmission and reception schedule. In this case, when information system data is divided into a plurality of data, the communication management part 110 provides each of the plurality of divided data to the message communication part 122.

The cyclic communication part 121 converts first control data and second control data into a data format of the control network 30. The cyclic communication part 121 outputs the converted first control data and second control data to the communication driver 130 according to a transmission and reception schedule provided from the communication management part 110.

The message communication part 122 outputs information system data to the communication driver 130 according to a transmission and reception schedule provided from the communication management part 110.

The communication driver 130 controls the transmission and reception part 104, and performs communication of first control data and second control data according to a cyclic period via the control network 30. In this case, when second control data is divided into a plurality of communication data, the plurality of communication data are sequentially communicated according to a cyclic period. Similarly, when information system data is divided into a plurality of data, the plurality of divided data are sequentially communicated.

Here, the user application processing part 141 executes the above user application program. The user application processing part 141 acquires second control data from the industrial personal computer 62. For example, the other processing part 142 performs a start process of the control device 10, an initial process of control using the control network 30, and the like.

(Specific Communication Process)

Figure 5:
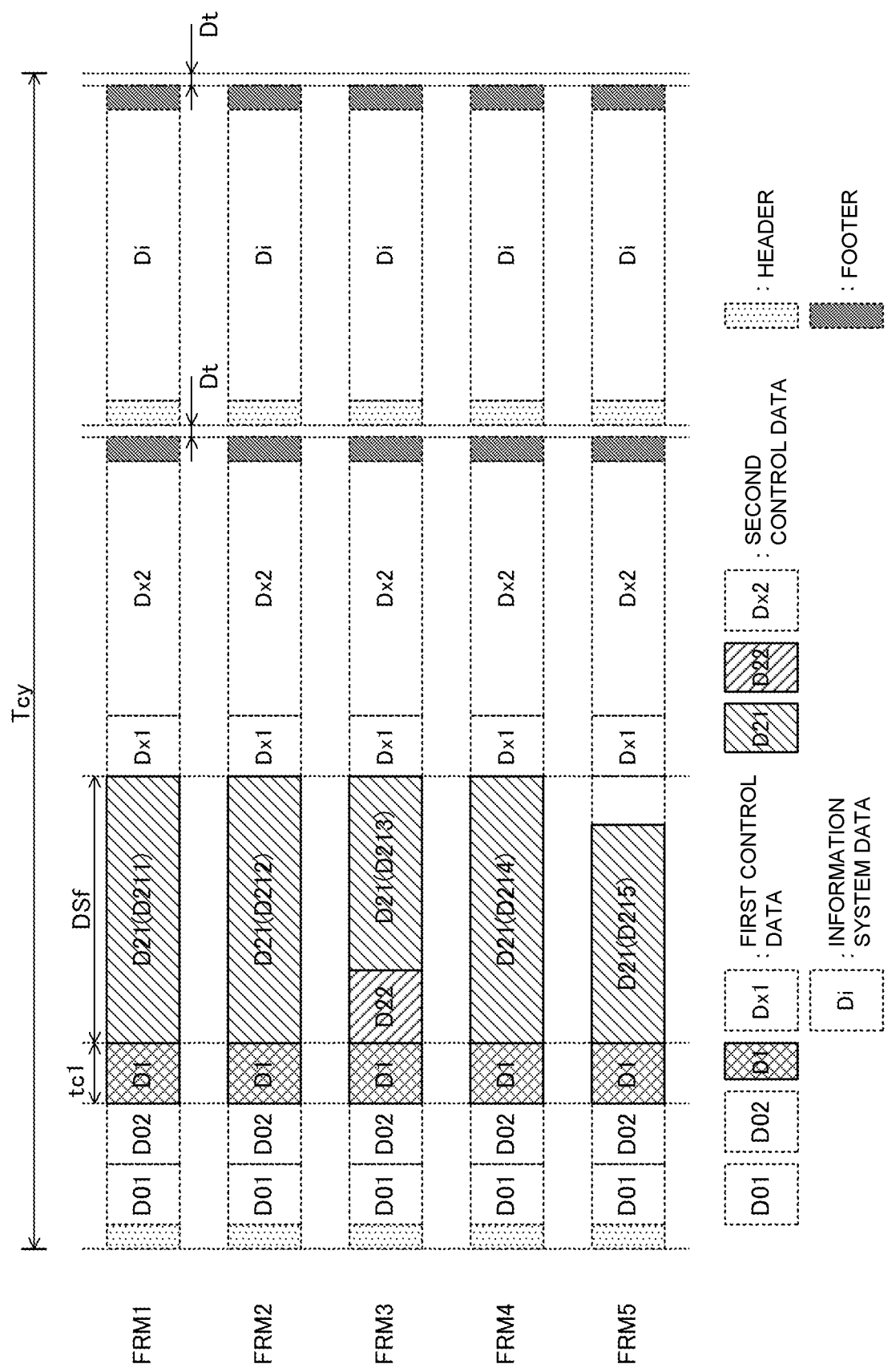
FIG. 5 is a diagram showing an example of a data structure of frame data.

A communication process performed by the control device 10 will be briefly described with reference to FIG. 4 and FIG. 5. As described above, FIG. 4 is a diagram showing a communication concept of the disclosure. FIG. 5 is a diagram showing an example of a data structure of frame data. Here, FIG. 5 shows a data structure example of a system configuration shown in FIG. 1.

First, a structure of frame data will be described with reference to FIG. 5. As shown in FIG. 5, the frame data is data arranged, from the beginning, in order of a control data header, first control data D01 for the slave device 211, first control data D02 for the slave device 212, first control data D1 for the slave device 221, second control data D21 for the slave device 221, first control data Dx1 for the slave device 222, second control data Dx2 for the slave device 222, a control data footer, an information system data header, information system data Di, and an information system data footer. In addition, in FIG. 5, in the frame data, between the control data footer and the information system data header, and after the information system data header, an empty data area corresponding to a waiting time Dt for data collision avoidance is set. This waiting time Dt is preferably set, but it can be omitted. Thus, according to frame data having such a structure, communication in one cycle of a cyclic period is performed.

Next, a specific process when division of second control data is necessary for the slave device 221 will be described.

When the second control data D21 is acquired, the communication management part 110 of the control device 10 stores it in a buffer memory included in the communication management part 110 or the like. The buffer memory is physically realized by, for example, a volatile storage element included in the transmission and reception part 104, and the memory 102.

In this case, a state BF0 of the buffer memory is a state in which all second control data D21 is stored.

The communication management part 110 reads communication data D211 in the second control data D21 in the state BF0 from the buffer memory and outputs it to the cyclic communication part 121 until a communication timing t1 according to a cyclic period reaches. The communication data D211 is data corresponding to the communication upper limit volume DSf of second control data that can be communicated in one cycle of a cyclic period.

The communication upper limit volume DSf is calculated by, for example, subtracting a communication volume (in FIG. 5, a volume corresponding to the communication time tc1) of first control data D1 from a communication volume for a target slave device (here, the slave device 221) in one cycle of a cyclic period (Tcy in FIG. 5).

The cyclic communication part 121 performs communication of a frame data FRM1 including communication data D211 of first control data D1 and second control data D21 at a communication timing t1.

According to communication at the communication timing t1, a state BF1 of the buffer memory is a state in which data excluding the communication data D211 from the second control data D21 in the state BF0 is stored.

Next, the communication management part 110 reads communication data D212 in the second control data D21 in the state BF1 from the buffer memory and outputs it to the cyclic communication part 121 until a communication timing t2 reaches. The communication data D212 is data of the communication upper limit volume DSf.

The cyclic communication part 121 performs communication of frame data FRM2 including communication data D212 of first control data D1 and second control data D21 at the communication timing t2.

Then, when new second control data D22 is acquired until a communication timing t3 reaches, the communication management part 110 stores the second control data D22 in the buffer memory. A communication target slave device for this new second control data D22 is the same as that of the second control data D21.

In this state, a state BF2 in the buffer memory is a state in which data excluding the communication data D212 from the second control data D21 in the state BF1 and the second control data D22 are stored.

The communication management part 110 compares a priority of the second control data D21 with a priority of the second control data D22. When it is detected that a priority of the second control data D22 is higher than a priority of the second control data D21, the communication management part 110 reads the second control data D22 in the state BF2 from the buffer memory and outputs it to the cyclic communication part 121 until the communication timing t3 reaches. Here, although not shown in the example in FIG. 4, when a priority of the second control data D21 is higher than a priority of the second control data D22, the communication management part 110 continues control of division and communication of the second control data D21.

In addition, the communication management part 110 detects that a volume of the second control data D22 is smaller than the communication upper limit volume DSf. The communication management part 110 reads communication data D213 corresponding to a volume that can be communicated in frame data FRM3 in the second control data D21 from the buffer memory and outputs it to the cyclic communication part 121. Here, although not shown in FIG. 4, when a volume of the second control data D22 is larger than the communication upper limit volume DSf, the communication management part 110 performs control of division and communication according to the same communication data as the second control data D21.

The cyclic communication part 121 performs communication of the frame data FRM3 including first control data D1, second control data D22, and communication data D213 of second control data D21 at the communication timing t3.

According to communication at the communication timing t3, a state BF3 of the buffer memory is a state in which data excluding the communication data D213 and excluding the second control data D22 from the second control data D21 in the state BF2 is stored.

Next, the communication management part 110 reads communication data D214 in the second control data D21 in the state BF3 from the buffer memory and outputs it to the cyclic communication part 121 until a communication timing t4 reaches. The communication data D214 is data corresponding to the communication upper limit volume DSf.

The cyclic communication part 121 performs communication of a frame data FRM4 including communication data D214 of first control data D1 and second control data D21 at the communication timing t4.

According to communication at the communication timing t4, a state BF4 of the buffer memory is a state in which data excluding communication data D214 from the second control data D21 in the state BF3 is stored.

Next, the communication management part 110 reads communication data D215 in the second control data D21 in the state BF4 from the buffer memory and outputs it to the cyclic communication part 121 until a communication timing t5 reaches. The communication data D215 is data having a smaller volume than the communication upper limit volume DSf.

The cyclic communication part 121 performs communication of a frame data FRM5 including communication data D215 of first control data D1 and second control data D21 at the communication timing t5.

According to this process, the control device 10 performs communication control of the second control data D21 and the second control data D22 having different priorities according to their priorities. Therefore, it is possible to perform communication in which performance requirements (such as an arrival guarantee time) of the second control data D21 and performance requirements (such as an arrival guarantee time) of the second control data D22 are satisfied.

In particular, in the above process, in a state in which there is second control data D21 that is communicated in a divided manner, even if second control data D22 having a higher priority is acquired, the second control data D22 having a higher priority can be preferentially communicated, and the second control data D21 of which communication in a divided manner is temporarily stopped can be reliably communicated.

Figure 6:
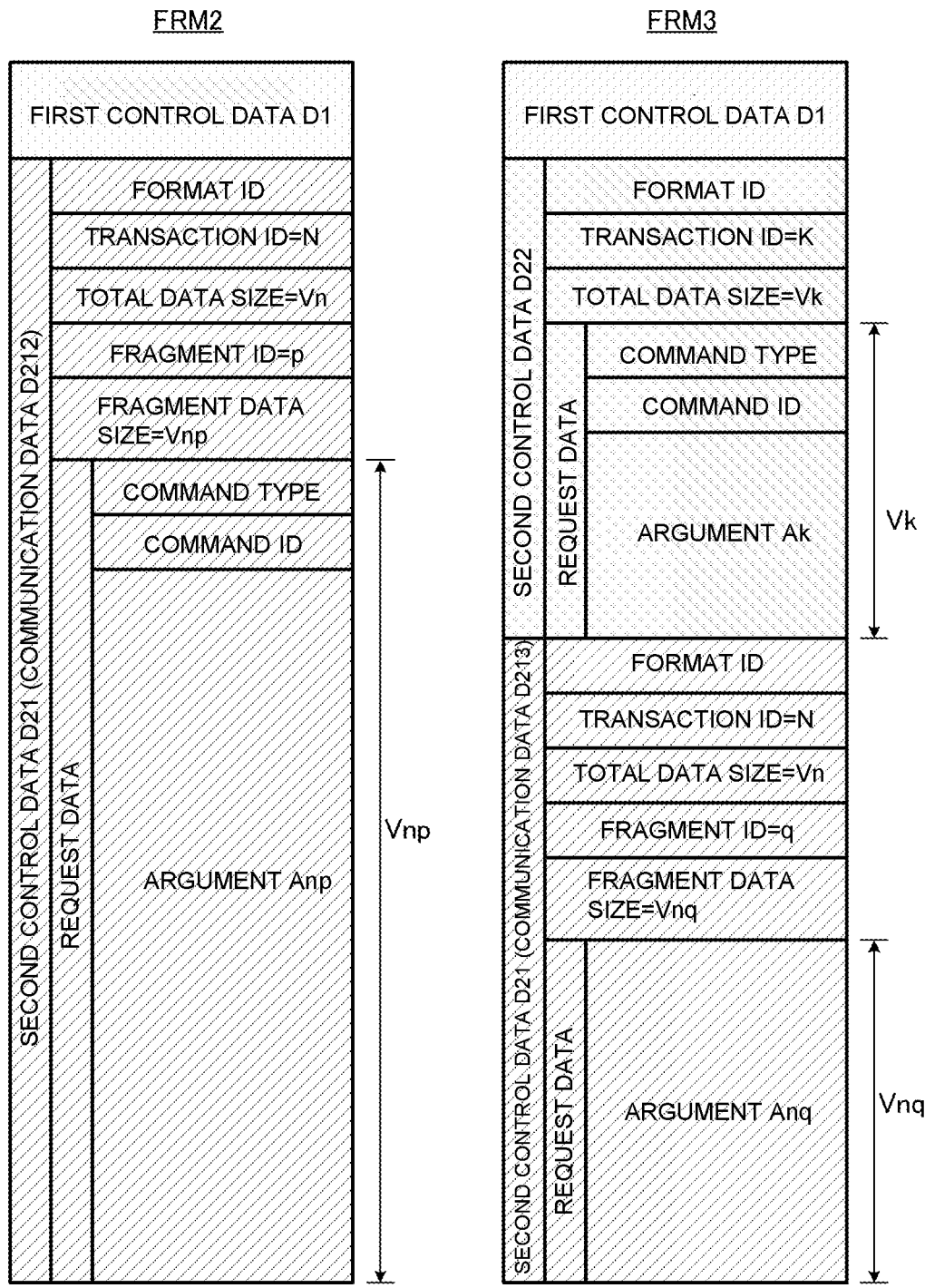
FIG. 6 is a diagram showing an example of a specific data structure of frame data.

When such a process is performed, frame data including a plurality of second control data have, for example, a data structure shown in FIG. 6. FIG. 6 is a diagram showing an example of a specific data structure of frame data. Here, in FIG. 6, the above frame data FRM2 and frame data FRM3 shown in FIG. 4 and FIG. 5 are shown as examples. However, the other frame data have the same data structure, and illustration and description of the other frame data will be omitted. In addition, in these drawings, a state in which no information system data is included in shown. In addition, in FIG. 6, second control data for one slave device is shown, and when there are a plurality of slave devices as communication targets of second control data, first control data and second control data shown in FIG. 6 are provided in a number corresponding to the number of slave devices that perform communication within one frame data.

As shown in FIG. 6, first control data and second control data are included in data for a target slave device in frame data corresponding to communication data in one cycle of a cyclic period.

Basically, second control data and communication data of frame data include a format ID, a transaction ID, a total data size, a fragment ID, a fragment data size, and request data, and is data arranged in that order from the leading bit. Here, second control data of which communication in a divided manner is not performed may not include a fragment ID and a fragment data size.

The format ID is identification data in a data format of second control data. According to the format ID, a data format of second control data can be identified.

The transaction ID is identification data representing second control data. When transaction IDs of communication data of a plurality of frames are compared, it is possible to determine whether communication data of these plurality of frames are based on the same second control data. That is, when transaction IDs of communication data of a plurality of frames are the same, it is possible to determine that such communication data are based on one second control data.

The total data size represents a total data volume of one second control data. That is, the total data size is represented by a sum of data volumes of a plurality of communication data when second control data is divided into a plurality of communication data. When such a total data size is attached, the slave device 221 and the slave device 222 can detect a reception error of second control data during restoring.

The fragment ID is identification data indicating the order of communication data in divided second control data. That is, according to the fragment ID, a number of a position of communication data in this frame after second control data before communication is divided can be identified.

The fragment size represents a data volume of request data within the frame. When such a fragment size is attached, the slave device 221 and the slave device 222 calculate a data volume of the received request, compares fragment sizes, and can detect a reception error.

Request data includes a command type, a command ID, an argument An, and the like and is data arranged in that order from the leading bit. The argument An includes a command group that is actually used for control, and the command type and the command ID are data for identifying a command group described in the argument An. While request data has been exemplified here, this can also be applied to response data for request data. Also, the request data and the response data are not limited to the above data structure and can be arbitrarily defined.

According to such a data structure, the frame data FRM2 and the frame data FRM3 have a data structure shown in FIG. 6.

The frame data FRM2 has a data structure in which communication data D212 of first control data D1 and second control data D21 is arranged in that order.

The communication data D212 includes a format ID, a transaction ID(=N), a total data size (=Vn), a fragment ID (=p), a fragment data size (=Vnp), and request data, and has a data structure in which these components are arranged in that order. The request data includes a command type, a command ID, and an argument Anp, and has a data structure in which these components are arranged in that order.

The frame data FRM3 has a data structure in which first control data D1, second control data D22, and communication data D213 of second control data D21 are arranged in that order.

The second control data D22 includes a format ID, a transaction ID (=K), a total data size (=Vk), and request data, and has a data structure in which these components are arranged in that order. The request data includes a command type, a command ID, and an argument Ak, and has a data structure in which these components are arranged in that order.

The communication data D213 includes a format ID, a transaction ID (=N), a total data size (=Vn), a fragment ID (=q), a fragment data size (=Vnq), and request data, and has a data structure in which these components are arranged in that order. The request data includes a command type, a command ID, and an argument Anq, and has a data structure in which these components are arranged in that order.

According to such a data structure, since transaction IDs of the communication data D212 and the communication data D213 both are N, it is possible to easily and reliably detect that both are data constituting the second control data D21.

In addition, since the fragment ID of the communication data D212 is p and the fragment ID of the communication data D213 is q, it is possible to easily and reliably detect that the argument Anp of the communication data D212 and the argument Anq of the communication data D213 are arranged in that order in the second control data D21.

In addition, according to the fragment data size Vnp, it is possible to detect a communication error such as loss of the communication data D212, and according to the fragment data size Vnq, it is possible to detect a communication error such as loss of the communication data D213.

In addition, according to the total data size Vn, it is possible to detect a communication error such as loss of the second control data D21 including the communication data D212 and the communication data D213, and according to the total data size Vk, it is possible to detect a communication error such as loss of the second control data D22.

(Specific Communication Processing Flow)

The above control is realized by performing the following process.

Figure 7A:
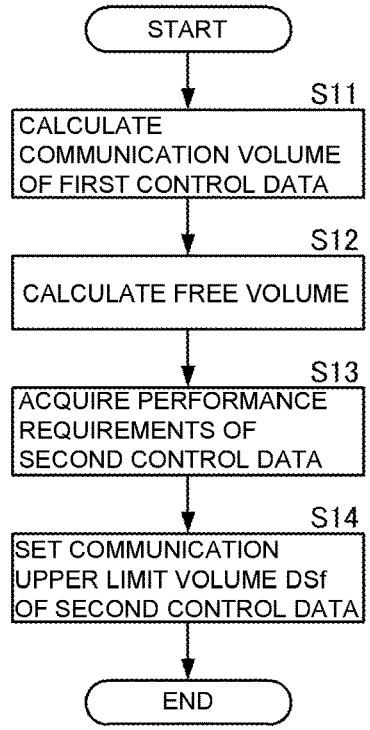
FIG. 7(A) is a flowchart showing an initial process performed by the control device when no information system data is included and FIG. 7(B) is a flowchart showing an initial process performed by the control device when information system data is included.
Figure 7B:
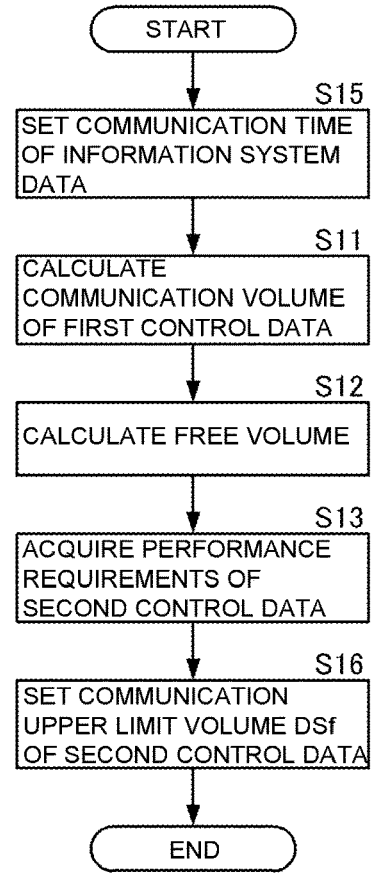

FIG. 7(A) is a flowchart showing an initial process performed by the control device when no information system data is included and FIG. 7(B) is a flowchart showing an initial process performed by the control device when information system data is included.

(A when Information System Data is not Communicated)

An initial process of the division process of second control data when a communication time for information system data is not set will be described with reference to FIG. 7(A).

First, the control device 10 allocates a communication band for each slave device with respect to one cycle of a cyclic period based on the number of communication target slave devices and a type. The control device 10 (the communication management part 110) calculates a communication volume of first control data (S11). Specifically, the control device 10 extracts all of first control data provided to the slave device 211, the slave device 212, the slave device 221, and the slave device 222 connected via the control network 30. These can be extracted and calculated based on a control program from the personal computer 61.

The control device 10 calculates a free volume for second control data for each slave device that performs communication of second control data included in one cycle of a cyclic period (S12). The free volume is a volume excluding a communication volume of first control data from a communication band of each slave device that performs communication of second control data in one cycle of a cyclic period (Tcy in FIG. 5). Therefore, the control device 10 calculates a free volume obtained by subtracting a communication volume of first control data from an upper limit volume with which each slave device that performs communication of second control data can perform communication in one cycle of a cyclic period.

The control device 10 acquires performance requirements of second control data (S13). The performance requirements of second control data include an arrival guarantee time of second control data. The performance requirements can be acquired based on a control program (for example, a robot control program) from the industrial personal computer 62.

The control device 10 sets a communication upper limit volume DSf of second control data for each slave device that performs communication of second control data based on the free volume and the performance requirements (S14).

The communication upper limit volume DSf corresponds to a maximum volume with which each slave device can perform communication of second control data in one cycle of a cyclic period. Specifically, for example, when performance requirements are satisfied, the control device 10 sets the free volume to the communication upper limit volume DSf.

(B when Information System Data is Communicated)

An initial process of the division process of second control data when a communication time for information system data is set will be described with reference to FIG. 7(B). Here, description of the same processes as in FIG. 7(A) will be simplified.

First, the control device 10 allocates a communication band for control data for each slave device with respect to one cycle of a cyclic period based on the number of communication target slave devices and a type. In this case, the control device 10 sets a communication volume of information system data (S15), and allocates a communication band for control data for each slave device in consideration of a communication volume of the information system data. The control device 10 calculates a communication volume of first control data (S11). The control device 10 calculates a free volume included in one cycle of a cyclic period (S12). The control device 10 acquires performance requirements of second control data (S13).

The communication volume of information system data can be set by receiving an instruction from, for example, the personal computer 61, the database device 63, or the like.

The control device 10 sets a communication upper limit volume DSf based on the free volume, the performance requirements, and the communication volume of information system data (S16).

Here, in the initial process shown in the above (A) and (B), the control device 10 generates a warning when it is determined that performance requirements of second control data are not satisfied in the calculated free volume. For example, specifically, the control device 10 calculates the number of divisions of second control data from the calculated free volume and calculates a communication completion scheduled time for second control data from the number of divisions. When a communication completion scheduled time is longer than an arrival guarantee time based on performance requirements, the control device 10 determines that performance requirements are not satisfied and generates a warning.

Figure 8:
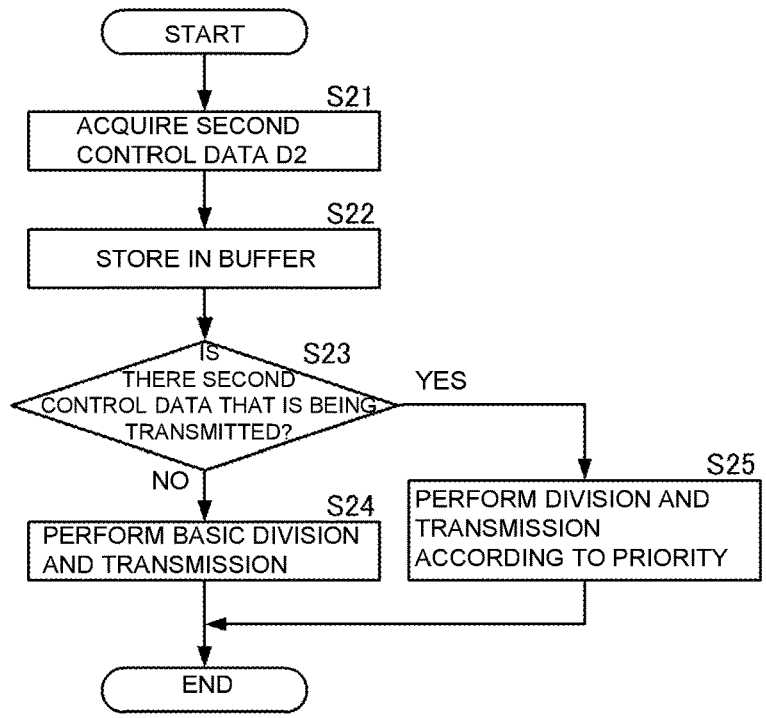
FIG. 8 is a flowchart showing a main process of a division and transmission process of second control data.

Next, a communication management process during an operation of the control system will be described with reference to FIG. 8. FIG. 8 is a flowchart showing a main process of a division and transmission process of second control data.

When second control data is acquired (S21), the control device 10 stores it in a buffer (S22).

The control device 10 detects whether there is second control data that is already being transmitted. When there is no second control data that is being transmitted (NO in S23), the control device 10 performs basic division and transmission (S24). When there is second control data that is being transmitted (YES in S23), the control device 10 performs division and transmission according to a priority (S25).

(Basic Division and Transmission)

Figure 9:
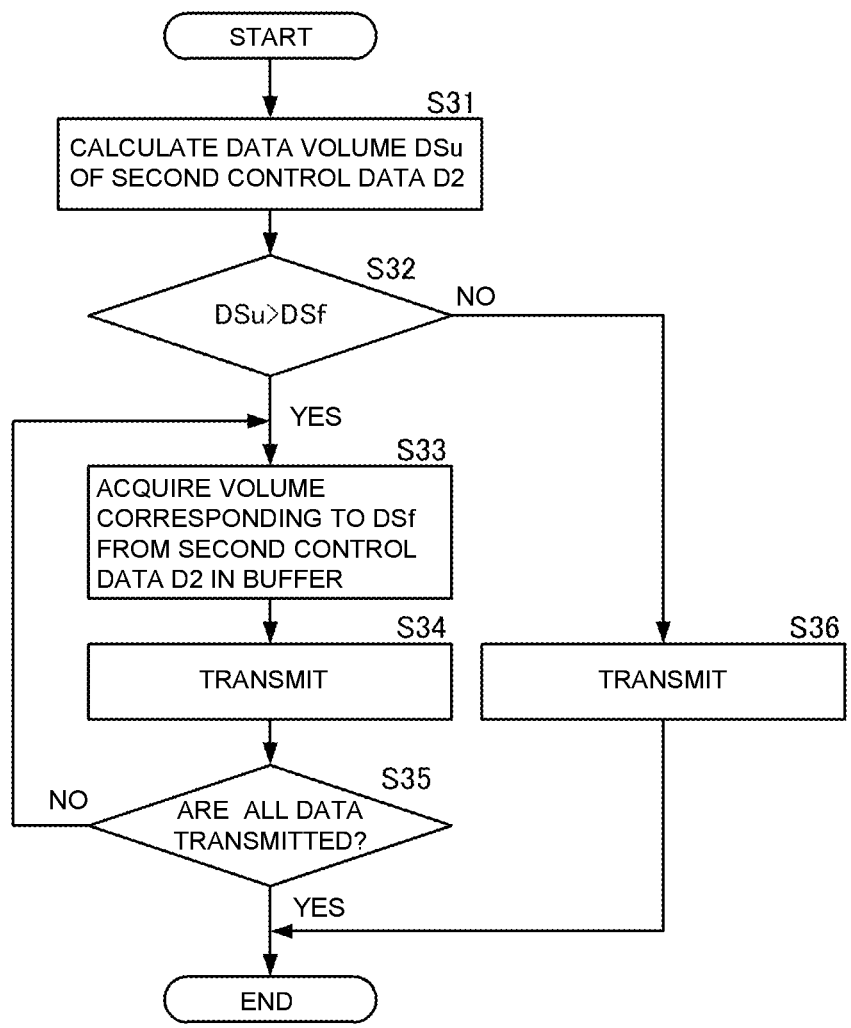
FIG. 9 is a flowchart showing a basic division and transmission process.

FIG. 9 is a flowchart showing a basic division and transmission process.

The control device 10 calculates a data volume (the remaining volume) DSu of the second control data D2 (S31).

When the data volume DSu is larger than the communication upper limit volume DSf (YES in S32), the control device 10 acquires data corresponding to the communication upper limit volume DSf from the second control data D2 stored in the buffer (S33). That is, the control device 10 divides communication data from the second control data D2. The control device 10 transmits the divided communication data (S34).

The control device 10 detects whether all data of the second control data D2 stored in the buffer are transmitted. When there is data that is not yet transmitted (NO in S35), the control device 10 returns to Step S33, and repeats a division process of second control data according to the communication upper limit volume DSf. When all data are transmitted (YES in S35), the control device 10 ends the process.

When the data volume DSu is equal to or smaller than the communication upper limit volume DSf (NO in S32), the control device 10 transmits the second control data D2 without performing the above division process (S36).

(Division and Transmission According to a Priority)

Figure 10:
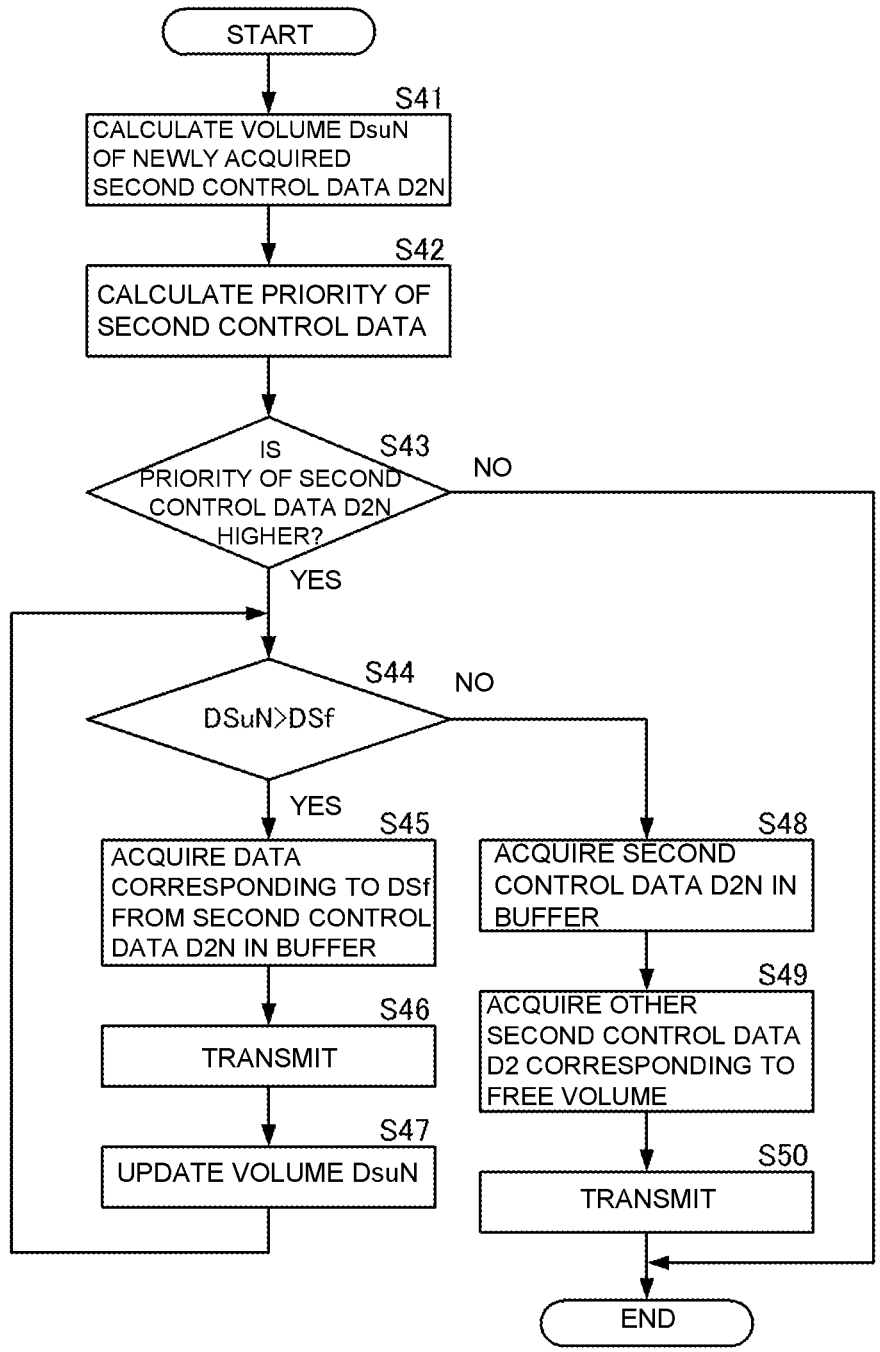
FIG. 10 is a flowchart showing a division and transmission process according to a priority.

FIG. 10 is a flowchart showing a division and transmission process according to a priority.

The control device 10 calculates a volume DSuN of newly acquired second control data D2N (S41). The control device 10 calculates priorities of second control data D2 that is being transmitted and new second control data D2N (S42). A specific method of calculating a priority will be described below.

The control device 10 compares a priority of the second control data D2 with a priority of the second control data D2N. When a priority of the second control data D2N is higher than a priority of the second control data D2 (YES in S43), the control device 10 preferentially transmits the second control data D2N. On the other hand, when a priority of the second control data D2 is the same as a priority of the second control data D2N or is higher than a priority of the second control data D2N (NO in S43), the control device 10 continues division and transmission of the second control data D2, and transmits the second control data D2N after transmission of the second control data D2 is completed.

When a priority of the second control data D2N is higher than a priority of the second control data D2, if the data volume DSuN is larger than the communication upper limit volume DSf (YES in S44), the control device acquires data corresponding to the communication upper limit volume DSf from the second control data D2N stored in the buffer (S45). That is, the control device 10 divides communication data from the second control data D2N. The control device 10 transmits the divided communication data (S46). The control device 10 calculates the remaining volume of the second control data D2N according to current transmission, and updates the data volume DSuN (S47), and returns to Step S44. This process continues until the remaining volume of the data volume DSuN is equal to or smaller than the communication upper limit volume DSf.

When the data volume DSuN is equal to or smaller than the communication upper limit volume DSf or is equal to or smaller than the communication upper limit volume DSf according to the above process (NO in S44), the control device 10 acquires a data volume DSuN that is equal to or smaller than the communication upper limit volume DSf (S48). In addition, the control device 10 acquires first communication data of transmission resumption of the second control data D2 (S49). The first communication data of transmission resumption is data having a volume corresponding to a value obtained by subtracting a data volume DSuN of second control data D2N from a communication upper limit volume DSf in the remaining volume of the second control data D2. The control device 10 transmits first communication data of transmission resumption of the second control data D2N and the second control data D2 (S50).

In this manner, when second control data D2N having a higher priority is acquired while the second control data D2 is transmitted, the control device 10 temporarily stops transmission of the second control data D2 and transmits the second control data D2N having a higher priority in an interrupted manner. Then, the control device 10 performs transmission of the second control data D2N and subsequently resumes transmission of the second control data D2 that is temporarily stopped. Therefore, even if the second control data D2N having a higher priority is acquired while the second control data D2 having a lower priority is transmitted, transmission can be performed such that performance requirements of the second control data D2N are satisfied.

(Method of Calculating a Priority)

FIG. 11 is a flowchart showing a method of calculating a priority. FIG. 12 is a diagram explaining a priority calculation concept and a data transmission concept according to a priority.

As shown in FIG. 11, the control device 10 calculates the remaining volume DSu of the plurality of second control data D2 stored in the buffer (S61). In this case, the control device 10 sets a volume obtained by subtracting a volume of data that has been transmitted from the total data volume as the remaining volume DSu for the second control data D2 that is being transmitted. On the other hand, the control device 10 sets the total data volume as the remaining volume DSu for the second control data D2 that has not yet been transmitted.

The control device 10 calculates a remaining time tsu of the plurality of second control data D2 (S62). The remaining time tsu is calculated from a time obtained by subtracting a current time from an arrival guarantee time included in the performance requirements.

The control device 10 calculates a priority S from the remaining volume DSu and the remaining time tsu (S63). For example, the control device 10 sets a value obtained by dividing the remaining volume DSu by an index value based on the remaining time tsu as a priority. Specifically, according to the example in FIG. 12, a value obtained by dividing the remaining volume [byte] by an index value obtained by subtracting 1 [msec.] from the remaining time tsu [msec.] is set as a priority S. In this case, as a value of the priority S increases, the priority is higher. Here, a case in which 1 [msec.] is used for calculating an index value is shown. This shows a case in which a cyclic period is 1 [msec.]. That is, the index value may be a value obtained by subtracting a cyclic period from the remaining time tsu.

According to such a process, it is possible to accurately calculate a priority with a simple process.

A process example will be described with reference to FIG. 12.

At a time Tc(n), second control data D21 and second control data D22 are stored in the buffer. In this case, as shown in FIG. 12, the priority S calculated from the remaining volume DSu and the remaining time tsu is higher in second control data D21 than in second control data D22.

Therefore, the control device 10 divides communication data corresponding to a communication upper limit volume DSf (in FIG. 12, 256 bytes) in the second control data D21 and transmits the divided data. Then, the control device 10 performs update in which a data volume according to transmission at the time Tc(n) is subtracted from the remaining volume of the second control data D21.

At a time Tc(n+1), new second control data D23 is stored in the buffer. In this case, as shown in FIG. 12, the priority S calculated from the remaining volume DSu and the remaining time tsu is higher in the second control data D23 than in the second control data D21 and the second control data D22. In addition, a data volume (the remaining volume DSu) of the second control data D23 is smaller than the communication upper limit volume DSf.

The control device 10 transmits the second control data D23. In addition, the control device 10 calculates a data volume (a supplementary data volume) corresponding to a value obtained by subtracting the remaining volume DSu of the second control data D23 from the communication upper limit volume DSf. The control device 10 transmits data corresponding to the supplementary data volume in the second control data D21 having the next highest priority S following the second control data D23 in the same frame. Then, the control device 10 performs update in which a data volume according to transmission at the time Tc(n+1) is subtracted from the remaining volume of the second control data D21 and the remaining volume of the second control data D23.

At a time Tc(n+2), transmission of the second control data D23 is completed, and the second control data D21 and the second control data D22 are stored in the buffer. In this case, as shown in FIG. 12, the priority S calculated from the remaining volume DSu and the remaining time tsu is higher in the second control data D21 than in the second control data D22.

Therefore, the control device 10 divides communication data corresponding to a communication upper limit volume DSf (in FIG. 12, 256 bytes) in the second control data D21 and transmits the divided data. Then, the control device 10 performs update in which a data volume according to transmission at the time Tc(n+2) is subtracted from the remaining volume of the second control data D21.

At a time Tc(n+3), second control data D21 and second control data D22 are stored in the buffer. In this case, as shown in FIG. 12, the priority S calculated from the remaining volume DSu and the remaining time tsu is higher in the second control data D21 than in the second control data D22. In addition, a data volume (the remaining volume DSu) of the second control data D21 is smaller than the communication upper limit volume DSf.

The control device 10 transmits the second control data D21. In addition, the control device 10 calculates a data volume (a supplementary data volume) corresponding to a value obtained by subtracting the remaining volume DSu of the second control data D21 from the communication upper limit volume DSf. The control device 10 transmits data corresponding to the supplementary data volume in the second control data D22 having the next highest priority S following the second control data D21 in the same frame. Then, the control device 10 performs update in which a data volume according to transmission at the time Tc(n+3) is subtracted from the remaining volume of the second control data D21 and the remaining volume of the second control data D22.

Hereinafter, the control device 10 continues division and transmission of the second control data D22.

Here, while an FA system has been exemplified in the above description, the above configuration and process can be applied to other systems in which data for which a time is guaranteed using a cyclic period and data having a longer guarantee time than a cyclic period and having a larger data volume than a data volume based on the cyclic period are communicated, and the above actions and effects can be obtained.

In addition, in the above description, for easy explanation, transmission of data from the control device 10 to the slave device 211, the slave device 212, and the slave device 221 via the control network 30 has been mainly described. However, each data include data that is transmitted from the slave device 211, the slave device 212, and the slave device 221 and replied to the control device 10, and the above process can also be applied to such data and the above actions and effects can be obtained. That is, the above process can be applied to second control data that is communicated via the control network 30, and the above actions and effects can be obtained. For example, regarding second control data for a robot device, data that is transmitted from the control device 10 to the slave device 221 includes a log data acquisition command, and data that is transmitted (replied) from the slave device 221 to the control device 10 includes logging data (for example, angle data of a motor for several tens of seconds) corresponding to the acquisition command.

In addition, while a process when a data volume of second control data to be interrupted is equal to or smaller than the communication upper limit volume DSf has been described above, if a data volume of second control data to be interrupted exceeds the communication upper limit volume DSf, communication in a divided manner is performed. In this case, the same data structure as the above second control data that is temporarily stopped may be adopted.

In addition, in the above description, a predetermined byte of a communication band for second control data having a high priority may be allocated for the entire communication band for second control data. That is, a communication band may be divided according to a priority. In this case, when there is no second control data having a high priority, a communication band for second control data having a high priority may be used for communication of the other second control data.

In addition, the control device may set a communication upper limit volume in basic communication in a divided manner so that a predetermined byte of a communication band used when second control data having a high priority is generated can be secured always.

In addition, while performing of communication according to a TDMA scheme has been described above, division and transmission of second control data can be realized according to a CDMA scheme or the like using the above concept.

In this configuration, based on priorities of second control data that is divided and transmitted and the new second control data, communication of the second control data that is divided and transmitted can be temporarily stopped, and communication is performed according to respective performance requirements of second control data.

According to an example of the disclosure, when a priority of the new second control data is higher than a priority of the second control data that is being communicated, the communication management part temporarily stops communication of the second control data that is being communicated and performs communication of the new second control data. Then, after communication of the new second control data is completed, the communication management part resumes communication of the second control data that is temporarily stopped.

In this configuration, when a priority of new second control data is high, the new second control data is preferentially communicated. In addition, subsequently, the second control data that is temporarily stopped is communicated.

According to an example of the disclosure, the communication management part determines the priority using the remaining volume of the plurality of second control data and a remaining time until an arrival guarantee time of the plurality of second control data.

In this configuration, for respective second control data, a communication order is controlled so that communication of the remaining volume can be completed within the remaining time.

According to an example of the disclosure, when a volume of the new second control data does not reach an upper limit volume for second control data secured for one cycle of the cyclic period, the communication management part performs communication of the communication data of the second control data that is temporarily stopped according to the same cyclic period as that of the new second control data.

In this configuration, communication of the second control data that is temporarily stopped is resumed without waiting until the next cyclic period in which new second control data is communicated.

According to an example of the disclosure, the communication management part attaches a communication order to the plurality of communication data in the second control data.

In this configuration, it is possible to ascertain an error related to communication such as lack of information for the plurality of communication data.

In this configuration, when a robot device is included as an FA system, a plurality of commands including a command order are accurately communicated to the robot device within an arrival guarantee time. Therefore, it is possible to prevent problems such as a delay of an operation of a robot device and a malfunction.

According to the disclosure, even if control data having a high urgency is acquired during communication of control data having a large volume for which a plurality of cyclic periods are necessary, it is possible to reliably communicate the control data having a high urgency according to performance requirements.

What is claimed is:

1. A control device comprising:
a controller circuitry configured to:
control communication of first control data of which arrival in a first guarantee time is guaranteed according to a preset cyclic period and second control data of which arrival in a second guarantee time longer than the cyclic period is guaranteed and of which a sequence of information included is determined; and
manage a communication schedule of the first control data and the second control data,
wherein control communication of the second control data comprising:
storing the second control data in a buffer memory;
dividing the second control data into a plurality of communication data according to the cyclic period and starting to perform communication of the plurality of communication data;
acquiring new second control data during the communication of the plurality of communication data; and
communicating the new second control data according to the cyclic period, wherein a communication target slave device for the new second control data is the same as the communication target slave device of the second control data, and the controller circuitry is further configured to determine a communication sequence of the plurality of the communication data according to priorities of the second control data, wherein the communication target slave device is a robot device or a robot control device, wherein, when a priority of the new second control data is higher than a priority of the second control data, the controller circuitry temporarily stops any communication of the second control data and performs a communication of the new second control data, and after the communication of the new second control data is completed, the controller circuitry is further configured to resume the communication of the second control data that has been temporarily stopped, wherein, when a volume of the new second control data does not reach an upper limit volume for second control data secured for one cycle of the cyclic period, the controller circuitry performs communication of the communication data of the second control data that is temporarily stopped according to the same cyclic period as that of the new second control data.

2. The control device according to claim 1, wherein the controller circuitry determines the priority using the remaining volume of the plurality of second control data and a remaining time until an arrival guarantee time of the plurality of second control data.

3. The control device according to claim 2, wherein, when a volume of the new second control data does not reach an upper limit volume for second control data secured for one cycle of the cyclic period, the controller circuitry performs communication of the communication data of the second control data that is temporarily stopped according to the same cyclic period as that of the new second control data.

4. The control device according to claim 2, wherein the controller circuitry attaches a communication order to the plurality of communication data in the second control data.

5. A control system comprising:
the control device according to claim 2; and
a robot device or a robot control device that is communicably connected to the control device,
wherein the second control data includes a command group for robot control.

6. The control device according to claim 1, wherein the controller circuitry attaches a communication order to the plurality of communication data in the second control data.

7. A control system comprising:
the control device according to claim 6; and
a robot device or a robot control device that is communicably connected to the control device,
wherein the second control data includes a command group for robot control.

8. A control system comprising:
the control device according to claim 1; and
a robot device or a robot control device that is communicably connected to the control device,
wherein the second control data includes a command group for robot control.

9. A control method comprising:
a cyclic communication process of controlling communication of first control data of which arrival in a first guarantee time is guaranteed according to a preset cyclic period and second control data of which arrival in a second guarantee time longer than the cyclic period is guaranteed and of which a sequence of information included is determined; and
a communication management process of managing a communication schedule of the first control data and the second control data,
wherein controlling communication of the second control data comprises:
storing the second control data in a buffer memory;
dividing the second control data into a plurality of communication data according to the cyclic period and starting to perform communication of the plurality of communication data;
acquiring new second control data during the communication of the plurality of communication data; and
communicating the new second control data according to the cyclic period, wherein a communication target slave device for the new second control data is the same as the communication target slave device of the second control data, and further determining a communication sequence of the plurality of the communication data according to priorities of the second control data, wherein the communication target slave device is a robot device or a robot control device; and
a process of, when a priority of the new second control data is higher than a priority of the second control data, temporarily stopping any communication of the second control data and performing a communication of the new second control data, and after the communication of the new second control data is completed, further resuming the communication of the second control data that has been temporarily stopped,
wherein, when a volume of the new second control data does not reach an upper limit volume for second control data secured for one cycle of the cyclic period, communication of the communication data of the second control data that is temporarily stopped is performed according to the same cyclic period as that of the new second control data.

10. A non-transitory computer-readable storage medium storing a control program comprising:
a cyclic communication process of controlling communication of first control data of which arrival in a first guarantee time is guaranteed according to a preset cyclic period and second control data of which arrival in a second guarantee time longer than the cyclic period is guaranteed and of which a sequence of information included is determined; and
a communication management process of managing a communication schedule of the first control data and the second control data,
wherein the control program causes an information processing device to execute the following processes in controlling communication of the second control data:
storing the second control data in a buffer memory;
dividing the second control data into a plurality of communication data according to the cyclic period and starting to perform communication of the plurality of communication data;
acquiring new second control data during the communication of the plurality of communication data; and
communicating the new second control data according to the cyclic period, wherein a communication target slave device for the new second control data is the same as the communication target slave device of the second control data, and further determining a communication sequence of the plurality of the communication data according to priorities of the second control data, wherein the communication target slave device is a robot device or a robot control device; and when a priority of the new second control data is higher than a priority of the second control data, temporarily stopping any communication of the second control data and performing a communication of the new second control data, and after the communication of the new second control data is completed, further resuming the communication of the second control data that has been temporarily stopped, wherein, when a volume of the new second control data does not reach an upper limit volume for second control data secured for one cycle of the cyclic period, communication of the communication data of the second control data that is temporarily stopped is performed according to the same cyclic period as that of the new second control data.

* * * * *